Feb. 25, 1964　　　H. J. BELLARTS　　　3,121,941
FLUID OPERATED TOOL FOR COUPLING TUBES TOGETHER
Filed Sept. 10, 1963　　　2 Sheets-Sheet 1
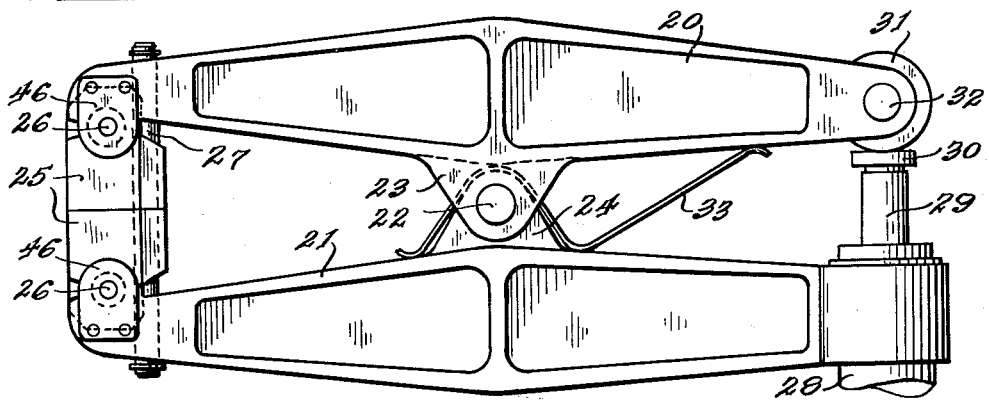
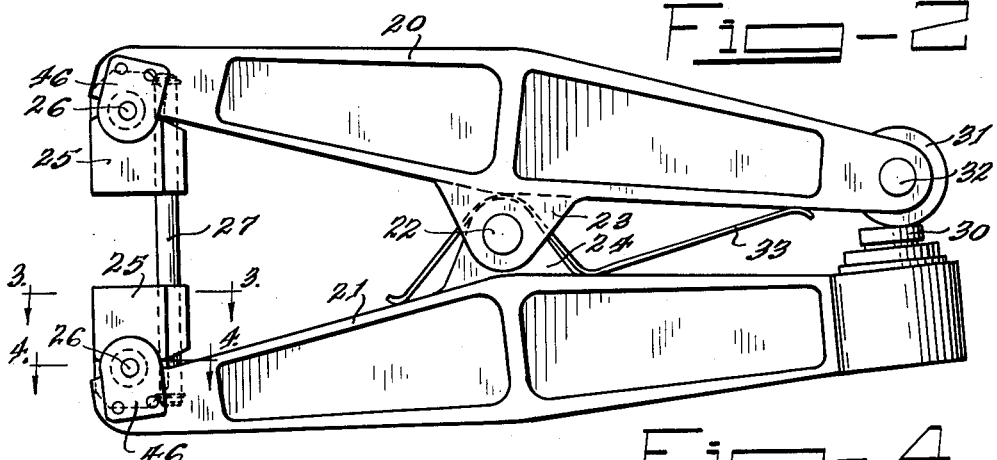
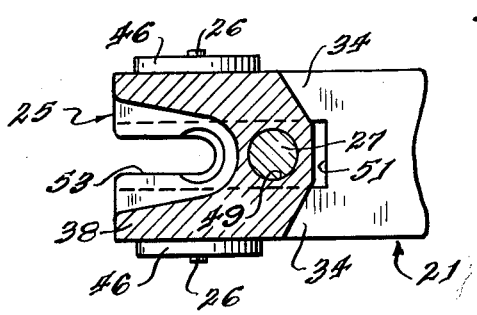
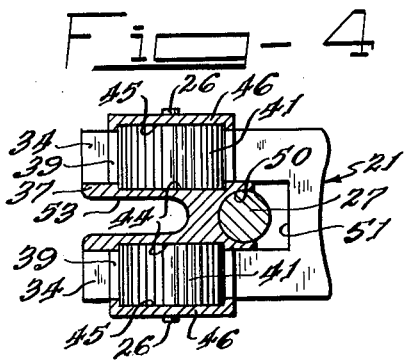
INVENTOR.
Henry J. Bellarts
BY
Roland G. Anderson
Attorney Feb. 25, 1964   H. J. BELLARTS   3,121,941
FLUID OPERATED TOOL FOR COUPLING TUBES TOGETHER
Filed Sept. 10, 1963   2 Sheets-Sheet 2
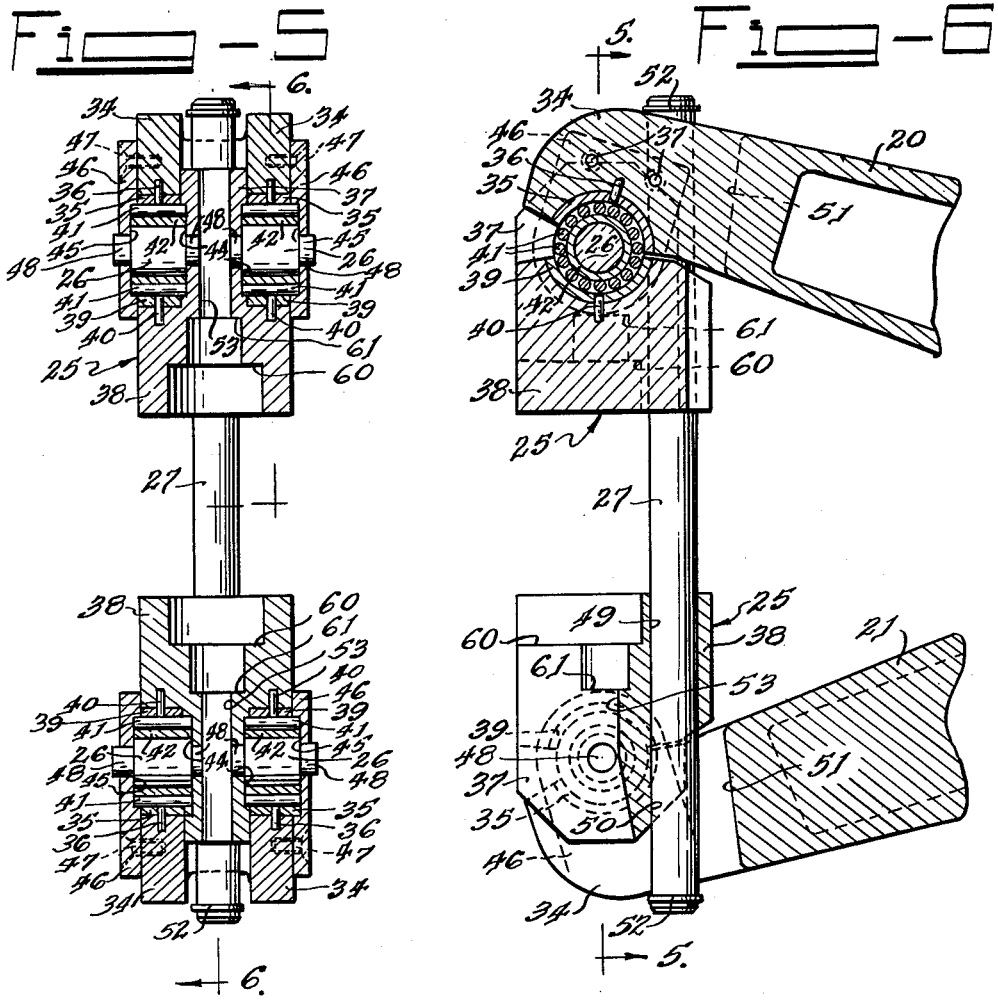
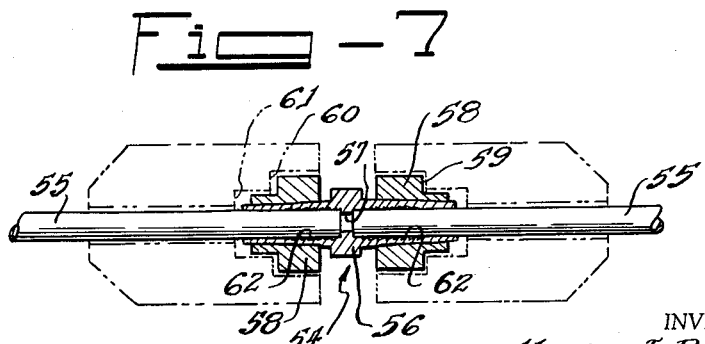
INVENTOR.
*Henry J. Bellarts*
BY
*Roland G. Anderson*
*Attorney*

United States Patent Office 3,121,941
Patented Feb. 25, 1964

3,121,941
FLUID OPERATED TOOL FOR COUPLING
TUBES TOGETHER
Henry J. Bellarts, Richland, Wash., assignor to the United
States of America as represented by the United States
Atomic Energy Commission
Filed Sept. 10, 1963, Ser. No. 308,041
3 Claims. (Cl. 29—252)

This invention relates to a tool for joining tubes and a multipart tube coupling to one another. More specifically, the invention relates to a tool of this type in which pivotally connected arms act against sockets moving on a straight line to force the parts of the coupling against one another.

When a tube coupling is being joined by force to aligned tubes to connect them to one another, it is important that the forces applied act in straight lines. This means that socket members receiving the coupling and tubes and applying joining forces to them should move in straight lines and be acted on by straight-line forces. Yet pivotally connected arms that in many ways are ideally suited to moving socket members toward one another for shaping, joining, etc do not normally act against the socket members with straight-line forces in the direction of movement of the socket members. Moreover, the angle between the arms may vary, and so they may act at varying angles against the socket members.

I have invented a bearing construction and arrangement that enable pivoted arms acting against socket members of an assembling tool to move the socket members in a straight line toward one another with forces that are essentially in a straight line.

In the drawings:

FIG. 1 is an elevation of the tool of the present invention, showing socket members of the tool brought together;

FIG. 2 is an elevation similar to FIG. 1 but showing the socket members moved apart;

FIGS. 3 and 4 are a fragmentary sectional view taken on the lines 3—3 and 4—4 of FIG. 2, showing a socket member and an aligning rod passing therethrough;

FIG. 5 is a sectional view taken on the line 5—5 of FIG. 6, showing the bearing construction and arrangement of the present invention;

FIG. 6 is a sectional view taken on the line 6—6 of FIG. 5 showing the bearing construction and the relationship of the aligning rod to the socket member and the arm; and FIG. 7 is a longitudinal sectional view taken through two tubes and a coupling showing how the tool of the present invention is applied thereto to join them.

As shown in FIGS. 1 and 2, a pair of arms 20 and 21 are arranged side by side in generally parallel relation and are connected for relative pivoting about regions generally midway between their ends, by means of a pin 22, which passes through spaced ears 23 formed on arm 20 and an ear 24 formed on arm 21 and extending between ears 23. At one end the arms 20 and 21 are connected with socket members 25 for pivoting with respect thereto about pins 26. The arms 20 and 21 move the socket members 25 toward and away from one another on a straight line by virtue of a guiding or aligning pin 27 which passes through the socket members. Power for moving the arms 20 and 21 about the pin 22 is supplied by an hydraulic cylinder 28 and a plunger 29. The cylinder 28 is fixed in the end of the arm 21 opposite the socket member 25. The plunger 29 is moved hydraulically in the cylinder 28 and has a hardened cap 30 which engages a circular bearing part 31, which is pivotally carried on a pin 32 on the end of the arm 20 opposite the socket member 25. A spring clip 33, which fits over the ear 24 and between the ears 23, acts against the arms 20 to urge them toward the position of FIG. 1.

As shown in FIGS. 5 and 6, each of the arms 20 and 21 has its end adjacent the associated socket member 25, bifurcated into two spaced parallel end portions 34. Each end portion 34 has an arcuate recess of sufficient length to receive a segment 35 of an outer bearing race somewhat less than 180° in arcuate length, the segment 35 being secured in end portion 34 by a pin 36. Each socket member 25 has a thin portion 37 and a thick portion 38. The thin portion 37 fits the space between the spaced end portions 34 of the arm 20 or 21. The thick portion 38 has two arcuate recesses of sufficient length to receive two segments 39 of outer bearing races, each segment being somewhat less than 180° in arcuate length and facing one of the outer-race segments 35. The segments 39 are secured to the thick portions 38 of the socket members 25 by pins 40.

There are four pairs of facing outer-race segments 35 and 39 in all, and associated with each pair of these segments is a full complement of needle bearings 41 which is only incompletely surrounded by the associated outer-race segments 35 and 39, because each of them is less than 180° in arcuate length. Each complement of needle bearings 41 completely surrounds an inner bearing race 42.

The needle bearings 41 are retained in place about the inner race 42, in spite of being only incompletely surrounded by the outer-race segments 35 and 39, because the needle bearings 41 and inner race 42 at one end fit in a circular recess 44 formed in the thin portion 37 of the socket member 25 and at the other end fit in a circular recess 45 formed in a side cap 46. There are four side caps 46 in all, one at the outer side of each of the four spaced end portions 34 of the arms 20 and 21. Each side cap 46 overlaps one side of the wide portion 38 of one socket member 25. The side caps are secured to the portions 34 by screws 47.

The arms 20 and 21 can pivot with respect to the socket members 25 while giving them straight-line movement toward and away from one another, because the outer-race segments 35 and 39 of each pair extend for less than 360°. The maintenance of a full complement of needle bearings 41 within each pair of outer-race segments 35 and 39 assures that the needle bearings will roll about the inner race 42 and thus that a true needle-bearing action will occur between the arm 20 or 21 and the associated socket member 25. If there were less than a full complement of needle bearings 41 about the inner race 42, the needle bearings might fall out or become cocked and thus jammed. If with less than a full complement the needle bearings were kept from falling out or cocking by special retainers that would limit their movement about the inner race 42, this action would cause the bearing to behave like a sliding bearing of ordinary construction.

Each of the inner races 42 embraces one of the pins 26, which were previously described as constituting pivots between the arm 20 or 21 and the associated socket member 25. Each pin 26 increases the compression strength of the inner race 42 and prevents it from being crushed. Each pin 26 has reduced end portions 48 which fit holes in one of the side caps 46 and the thin portion of one socket member 25, whereby the pin 26 serves as a pivot between the socket member and associated arm 20 or 21 and prevents the socket member and associated bearings from falling out of the associated arm 20 or 21.

As shown in FIGS. 3, 4, and 6, the aligning rod 27 fits an opening 49 which completely surrounds the rod and lies in the wide portion 38 of the socket member 25 and in a small part of the narrow portion 37. Continuing on in the narrow portion 37, the opening 44 becomes an open arcuate recess 50, which engages the aligning rod 27 only at one side. As shown in the lower part of FIG. 6, the open recess 50 permits the rod 27 to engage the socket member 25 over a relatively large part of its length for the sake of improved aligning of the socket member 25 by the rod 27 and yet permits the narrow portion 37 of the socket member to clear the arm 20 or 21 at a region 51 where the spaced end portions 34 terminate and are united in the body of the arm. The rod 27 may move longitudinally with respect to each socket member 25, and so an improved aligning action is obtained. The rod 27 is prevented from moving out of the socket members 25 by snap rings 52 which fit in exterior grooves near the ends of the rod.

As shown in FIG. 5, each socket member 25 is provided with a central through opening 53 which is aligned with the opening 53 in the other socket member 25. As shown in FIGS. 3 and 6, each opening 53 is open at the face away from the arm 20 or 21, or more particularly, at the face away from the region 51 of the arm. This arrangement permits lateral insertion of the work to be assembled, into the tool.

As shown in FIG. 7, the tool of the present invention is adapted to fasten a coupling 54 to aligned tubes 55 to connect them to one another. The coupling 54 comprises an inner tubular member 56 having a central internal flange 57 which the tubes 55 abut. The coupling 54 also comprises two short outer tubular pieces 58 having slightly conical internal surfaces engaging slightly conical external surfaces on the member 56. The tubular pieces 58 have external shoulders 59 engageable with shoulders 60 formed in the openings 53 in the socket members 25. Openings 53 also have shoulders 61.

As the arms 20 and 21 move the socket members 25 toward one another, the socket members move the tubular pieces 58 toward one another and along the member 56, and contraction of the member 56 on the tubes 55 results by virtue of the conical surfaces of the member 56 and the pieces 58. Internal projections or ribs 62 in the member 56 dig into the tubes 55 and hold them.

The arrangement of the work-receiving opening 53 in each socket member 25 between the two bearing assemblies connecting each of the arms 20 and 21 and its associated socket member 25 prevents any twisting couple on the arms 20 and 21 from being transmitted to the socket members 25.

It is understood that the invention is not to be limited by the details given herein but that it may be modified within the scope of the appended claims.

The embodiments of the invention in which an exclusive property or privilege is claimed are defined as follows:

1. A tool comprising a pair of arms lying side by side and being pivotally connected to one another at regions between their ends, one end of each arm being formed into spaced parallel portions, the said portions of one arm lying opposite the said portions of the other arm, each of the two faces of the spaced end portions of each arm facing the other arm being provided with a segment of an outer bearing race of somewhat less than 180°, a pair of socket members, one associated with the spaced end portions of each arm, each socket member having a central through opening and a shoulder therein to accommodate the coupling and one tube, each socket member being composed of a narrow portion and a wide portion, the narrow portion fitting the space between the spaced end portions of the associated arm, the wide portion being provided with segments of two outer bearing races, each segment being somewhat less than 180° and facing one of two segments of the outer bearing races on the spaced end portions of the associated arm, four inner bearing races, each lying between the outer-race segment on the face of one of the spaced end portions of one arm and the facing outer-race segment on the wide portion of the associated socket member, a full complement of needle bearings completely surrounding each inner bearing race and being incompletely surrounded by two associated outer-race segments, the narrow portion of each socket member having a circular recess at each side facing one of the spaced end portions of the associated arm, the recess receiving the inner bearing race and the needle bearings at one end, and four side caps, one side cap being secured to the outer side of each of the spaced end portions of the arms and overlapping the wide portion of the associated socket member, each side cap having a circular recess receiving the inner bearing and the needle bearings at the end opposite that received by the circular recess in the narrow portion of the socket member, whereby the needle bearings are kept by the said circular recesses in surrounding relation to the inner bearing race, in spite of the outer bearing races being formed in segments each of somewhat less than 180°.

2. The tool specified in claim 1 and further comprising an aligning rod for the socket members extending therethrough, the wide portion of each socket member having an opening fitting the aligning rod, the narrow portion of each socket member having an open arcuate recess engaging the rod at one side, the aligning rod extending freely between the spaced end portions of each arm and being free to move longitudinally with respect to the socket members.

3. The tool specified in claim 2 and further comprising four pins, one fitting the interior of each inner bearing race to increase its compression strength and to prevent it from being crushed, each pin having reduced ends fitting holes in the side cap and the narrow portion of the socket member in the recesses formed therein.

No references cited.